US 11,966,052 B2

(12) United States Patent
Maruyama et al.

(10) Patent No.: US 11,966,052 B2
(45) Date of Patent: Apr. 23, 2024

(54) ALERT SYSTEM AND RECORDING MEDIUM

(71) Applicant: HONDA MOTOR CO., LTD., Tokyo (JP)

(72) Inventors: Masaki Maruyama, Wako (JP); Minoru Higuchi, Wako (JP); Yuya Kishimoto, Wako (JP); Toshiaki Seo, Wako (JP); Masuhito Tanaka, Tokyo (JP); Kazuki Takano, Tokyo (JP); Hidehiro Takeda, Tokyo (JP); Misaki Koseki, Kawasaki (JP)

(73) Assignee: HONDA MOTOR CO., LTD., Tokyo (JP)

( * ) Notice: Subject to any disclaimer, the term of this patent is extended or adjusted under 35 U.S.C. 154(b) by 56 days.

(21) Appl. No.: 17/951,475

(22) Filed: Sep. 23, 2022

(65) Prior Publication Data

US 2023/0113575 A1 Apr. 13, 2023

(30) Foreign Application Priority Data

Sep. 29, 2021 (JP) .................. 2021-159822

(51) Int. Cl.
*B60K 35/00* (2006.01)
*G02B 27/01* (2006.01)
*B60K 35/23* (2024.01)
*B60K 35/26* (2024.01)
*B60K 35/28* (2024.01)

(52) U.S. Cl.
CPC .......... *G02B 27/0101* (2013.01); *B60K 35/00* (2013.01); *G02B 27/0179* (2013.01); *B60K 35/23* (2024.01); *B60K 35/26* (2024.01); *B60K 35/28* (2024.01); *B60K 2360/178* (2024.01); *G02B 2027/0141* (2013.01)

(58) Field of Classification Search
CPC ............ G02B 27/0101; G02B 27/0179; G02B 2027/0141; B60K 35/00; B60K 2360/178; B60K 35/28; B60K 35/23; B60K 35/26
USPC ...................................................... 340/904
See application file for complete search history.

(56) References Cited

U.S. PATENT DOCUMENTS

| 8,676,431 B1 * | 3/2014 | Mariet | G08G 1/0962 |
| | | | 701/28 |
| 10,448,180 B1 * | 10/2019 | Helm | B60R 11/0217 |
| 2001/0020211 A1 * | 9/2001 | Takayama | G01C 21/3626 |
| | | | 701/410 |
| 2007/0273555 A1 * | 11/2007 | Amano | G08G 1/0969 |
| | | | 340/935 |

(Continued)

FOREIGN PATENT DOCUMENTS

JP 2017-021546 A 1/2017

*Primary Examiner* — Kerri L McNally
*Assistant Examiner* — Thang D Tran
(74) *Attorney, Agent, or Firm* — Rankin, Hill & Clark LLP

(57) ABSTRACT

An alert system includes a display device, a display control unit, and a target recognition unit. The display control unit: when the number of targets recognized by the target recognition unit is equal to or more than an upper limit number, sets a display range of a surrounding icon as a whole circular area; and in a state where the number of targets is equal to or more than the upper limit number and the display range of the surrounding icon is set as the whole circular area, when the number of targets increases, reduces the size of the surrounding icon.

8 Claims, 12 Drawing Sheets

(56) References Cited

U.S. PATENT DOCUMENTS

| | | | |
|---|---|---|---|
| 2012/0300072 A1* | 11/2012 | Kim | B60R 1/00 |
| | | | 348/148 |
| 2015/0002285 A1* | 1/2015 | Hatakeyama | G08G 1/166 |
| | | | 340/435 |
| 2016/0077688 A1* | 3/2016 | Shim | B60K 35/00 |
| | | | 715/771 |
| 2016/0264045 A1* | 9/2016 | Ng-Thow-Hing | B60Q 9/00 |
| 2017/0292848 A1* | 10/2017 | Nepomuceno | G01C 21/3492 |
| 2018/0001903 A1* | 1/2018 | Nagy | B60W 30/09 |
| 2018/0105185 A1* | 4/2018 | Watanabe | G06V 40/172 |
| 2018/0198955 A1* | 7/2018 | Watanabe | G08G 1/16 |
| 2019/0204827 A1* | 7/2019 | Bhalla | B60W 50/16 |
| 2020/0064983 A1* | 2/2020 | Higuchi | G09G 5/377 |
| 2020/0101980 A1* | 4/2020 | Adams | B60H 1/008 |
| 2021/0023994 A1* | 1/2021 | Watanabe | G06T 19/20 |
| 2021/0239485 A1* | 8/2021 | Peng | G06V 20/20 |
| 2021/0270620 A1* | 9/2021 | Nepomuceno | G01C 21/3626 |

* cited by examiner

FIG.12

| NUMBER OF TARGETS | | ZERO, SINGLE | PLURAL |
|---|---|---|---|
| ALERT LEVEL | LEVEL 0 | NUMBER OF TARGETS: 0 WHOLE CIRCULAR AREA, LARGE DIAMETER, WHITE | — |
| | LEVEL 1 | NUMBER OF TARGETS: 1 PART IN DIRECTION OF TARGET, MEDIUM DIAMETER, YELLOW | NUMBER OF TARGETS: 2 WHOLE CIRCULAR AREA, MEDIUM DIAMETER, YELLOW |
| | LEVEL 2 | NUMBER OF TARGETS: 1 PART IN DIRECTION OF TARGET, SMALL DIAMETER, ORANGE | NUMBER OF TARGETS: 3 WHOLE CIRCULAR AREA, SMALL DIAMETER, ORANGE |
| | LEVEL 3 | NUMBER OF TARGETS: 1 PART IN DIRECTION OF TARGET, VERY SMALL DIAMETER, RED | NUMBER OF TARGETS: 4 OR MORE WHOLE CIRCULAR AREA, VERY SMALL DIAMETER BLINKING RED |

ALERT SYSTEM AND RECORDING MEDIUM

INCORPORATION BY REFERENCE

The present application claims priority under 35 U.S.C. § 119 to Japanese Patent Application No. 2021-159822 filed on Sep. 29, 2021. The content of the application is incorporated herein by reference in its entirety.

BACKGROUND OF THE INVENTION

Field of the Invention

The present invention relates to an alert system and a recording medium.

Description of the Related Art

Conventionally, there has been proposed an image display system for a vehicle with which other vehicles traveling in the surroundings of the vehicle are detected by a camera or a radar, and marking images of other vehicles are displayed on a front window by a HUD (Head Up Display) to be superimposed on the other vehicles viewed by the driver (for example, see Japanese Patent Laid-Open No. 2017-021546).

As described above, when a target such as another vehicle existing in the surroundings of a mobile body such as the vehicle is detected, it is desired that the attention of the operator is promptly directed toward the target.

The present invention is designed in view of the aforementioned circumstances, and it is an object thereof to provide an alert system that supports the operator to promptly pay attention to the target and to provide a recording medium.

SUMMARY OF THE INVENTION

As a first aspect for achieving the foregoing object, there is an alert system including: a display device configured to output, to a front window of a mobile body, a visual display viewable by an operator of the mobile body;
a display control unit configured to cause the display device to output a prescribed alert display to the front window as the visual display; and a target recognition unit configured to recognize a target existing in surroundings of the mobile body, in which the display control unit: causes the display device to display, on the front window, the alert display including a mobile body icon representing the mobile body and a surrounding icon a display range of which is changed in a circumferential direction of a circular area that surrounds the mobile body icon; when the target is recognized by the target recognition unit, causes the display device to display the surrounding icon on the front window by having a range including a part corresponding to a direction of the target with respect to the mobile body as the display range; when the number of the targets recognized by the target recognition unit is equal to or more than a prescribed upper limit number, sets the display range of the surrounding icon as a whole circular area; and in a state where the number of the targets recognized by the target recognition unit is equal to or more than the upper limit number and the display range of the surrounding icon is set as the whole circular area, when the number of the targets recognized by the target recognition unit increases, reduces a size of the surrounding icon.

In the alert system, the display control unit may: when the target is not recognized by the target recognition unit, set the display range of the surrounding icon as the whole circular area; and when a state where the target is not recognized by the target recognition unit shifts to a state where the target is recognized by the target recognition unit, gradually reduce the display range of the surrounding icon from the whole circular area to a part of the circular area corresponding to a direction from the mobile body toward the target.

In the alert system, when a state where the target of less than the upper limit value is recognized by the target recognition unit and a display mode of the surrounding icon is set to a first display mode that has a part of the circular area corresponding to the direction of the target with respect to the mobile body as the display range shifts to a state where the target is not recognized by the target recognition unit, the display control unit may be configured to switch the display mode of the surrounding icon to a second display mode that has the whole circular area as the display range.

In the alert system, the display control unit may perform processing for expanding a space between the mobile body icon and the surrounding icon once, while switching the display mode of the surrounding icon from the first display mode to the second display mode.

In the alert system, the display control unit may: when the target is not recognized by the target recognition unit, set the display mode of the surrounding icon to a third display mode that has the whole circular area as the display range; and when the state where the target is not recognized by the target recognition unit continues for a prescribed time or more, set the display mode of the surrounding icon to a fourth display mode that is different from the third display mode, with the whole circular area being the display range.

The alert system may include an influence degree recognition unit configured to recognize an influence degree of the target recognized by the target recognition unit for the mobile body, in which the display control unit may change a display mode of the surrounding icon according to the influence degree of the target.

The alert system may include a sound image localization control unit configured to change a sound image position of a prescribed alert sound perceived by the operator by controlling an output mode of a plurality of speakers provided in the mobile body, in which the sound image localization control unit may: when the target is not recognized by the target recognition unit, set the sound image position of the alert sound to a prescribed range of the surroundings of the operator; and when a state where the target is not recognized by the target recognition unit shifts to a state where the target is recognized by the target recognition unit, gradually reduce the range of the sound image position of the alert sound from the prescribed range toward a direction from the operator to the target.

As a second aspect for achieving the foregoing object, there is a non-transitory recording medium storing a control program for causing a computer to execute processing of: acquiring a recognition result of a target recognition unit that recognizes a target existing in surroundings of a mobile body; causing a controller that controls an operation of a display device to cause the display device to display a prescribed alert display according to the recognition result on a front window of the mobile body as a visual display, the display device outputting the visual display viewable by an operator of the mobile body on the front window; causing the display device to display, on the front window, the alert display including a mobile body icon representing the mobile body and a surrounding icon a display range of which is changed in a circumferential direction of a circular area surrounding the mobile body icon; when the target is recognized by the target recognition unit, causing the display device to display the surrounding icon on the front window by having a range including a part corresponding to a direction of the target with respect to the mobile body as the display range; when the number of targets recognized by the target recognition unit is a prescribed upper limit number or more, setting the display range of the surrounding icon to a whole circular area; and in a state where the number of the targets recognized by the target recognition unit is equal to or more than the upper limit number and the display range of the surrounding icon is set as the whole circular area, when the number of the targets recognized by the target recognition unit increases, reducing a size of the surrounding icon.

According to the alert system, it is possible to support the operator to promptly pay attention to the target.

BRIEF DESCRIPTION OF THE DRAWINGS

FIG. 12 is a setting table of the display modes of the surrounding icon.

DETAILED DESCRIPTION OF THE PREFERRED EMBODIMENTS

1. Configurations of Alert System and Vehicle

Figure 1:
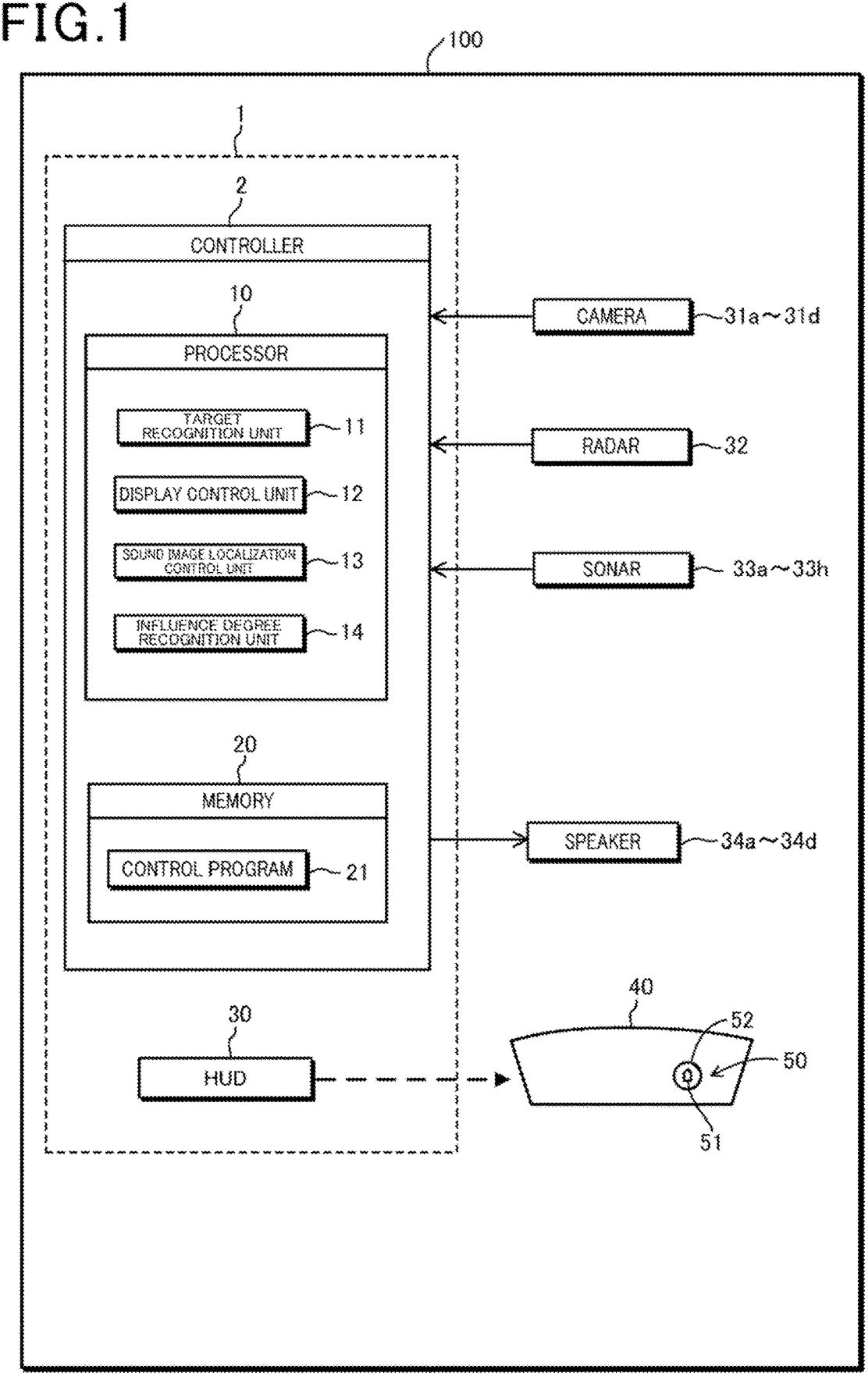
FIG. 1 is a block diagram of an alert system and a vehicle on which the alert system is loaded.

By referring to FIG. 1 to FIG. 3, configurations of a vehicle 100 and an alert system 1 loaded on the vehicle 100 will be described. The vehicle 100 corresponds to a mobile body of the present disclosure. As illustrated in FIG. 1, the alert system 1 includes a controller 2 and a HUD (Head Up Display) 30. The HUD 30 corresponds to a display device of the present disclosure.

The controller 2 is a control unit that includes a processor 10, a memory 20, and an interface circuit or the like, not illustrated. The HUD 30 outputs, to a front window 40 of the vehicle 100, an alert display 50 that is a visual display viewable by a driver (operator) P illustrated in FIG. 2. The controller 2 corresponds to a computer of the present disclosure. Referring to FIG. 2 and FIG. 3, the HUD 30 is disposed on a dashboard or the like underneath the front window 40, and a virtual image of the alert display 50 appears in front of the driver by projecting (outputting) the alert display 50 onto the front window 40. The HUD 30 of the present embodiment is configured to provide color display.

Figure 3:
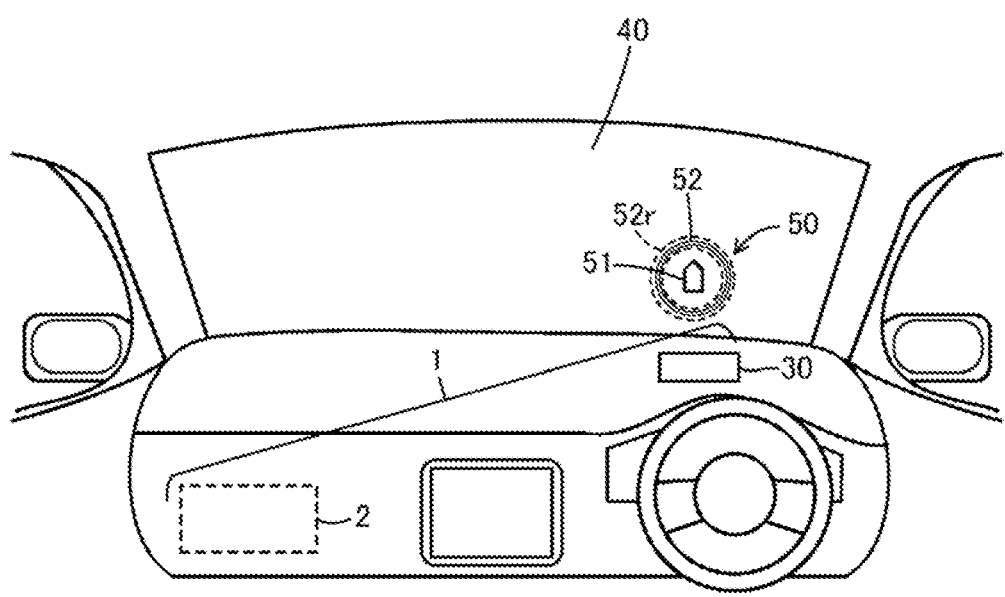
FIG. 3 is an explanatory diagram of an output mode of an alert display on a front window by the HUD.

As illustrated in FIG. 3, the alert display 50 includes a mobile body icon 51 representing the vehicle 100 and a surrounding icon 52 a display range of which is changed in the circumferential direction within a circular area 52r surrounding the mobile body icon 51. Details of the display mode of the surrounding icon 52 will be described later.

In addition to the alert system 1, the vehicle 100 also includes a plurality of cameras 31a to 31d, a radar 32, a plurality of sonars 33a to 33h, and a plurality of speakers 34a to 34d. As illustrated in FIG. 2, the camera 31a is provided at an upper part or the like of the front window 40, and outputs a captured image of the front side of the vehicle 100 to the controller 2. The camera 31b is provided in the vicinity or the like of a right door mirror, and outputs a captured image of the right side of the vehicle 100 to the controller 2. The camera 31c is provided in the vicinity or the like of a left door mirror, and outputs a captured image of the left side of the vehicle 100 to the controller 2. The camera 31d is provided in the rear side of the vehicle 100, and outputs a captured image of the rear side of the vehicle 100 to the controller 2.

Figure 2:
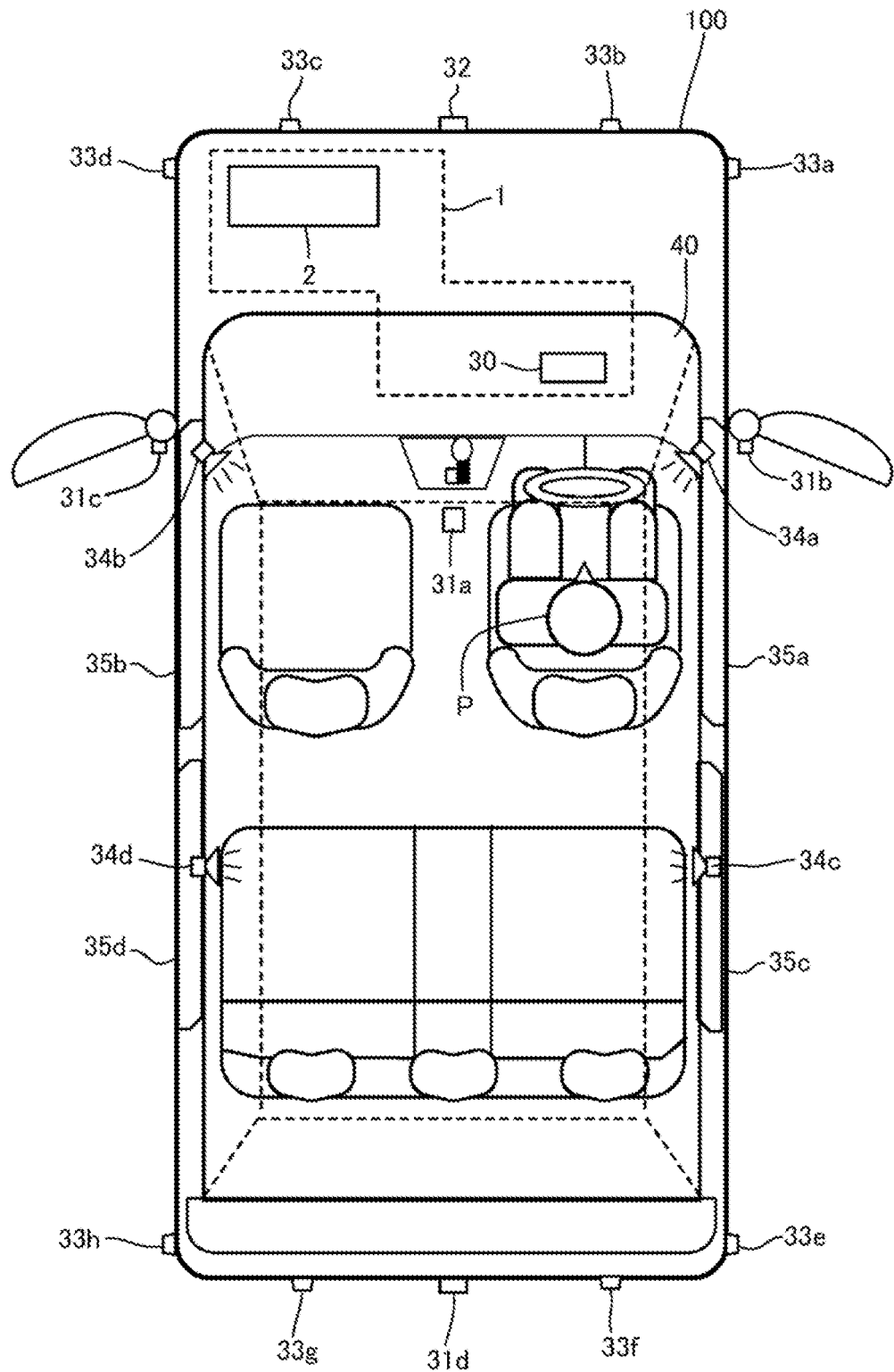
FIG. 2 is an explanatory diagram of a layout mode of a HUD and speakers in the vehicle.

As illustrated in FIG. 2, the radar 32 is provided in the front side of the vehicle 100, detects an object existing in front of the vehicle 100, and outputs a position detection signal to the controller 2. The sonars 33a to 33d are provided in the front side of the vehicle 100, detect an object existing in the vicinity of the front side of the vehicle 100, and output a position detection signal to the controller 2. The sonars 33e to 33h are provided in the rear side of the vehicle 100, detect an object existing in the vicinity of the rear side of the vehicle 100, and output a position detection signal to the controller 2. The speakers 34a to 34d are provided, for example, at a driver's door 35a, a passenger's door 35b, a right rear door 35c, and a left rear door 35d of the vehicle 100, respectively.

The processor 10 functions as a target recognition unit 11, a display control unit 12, a sound image localization control unit 13, and an influence degree recognition unit 14 by reading and executing a control program 21 of the alert system 1 saved in the memory 20. The control program 21 may be read out from a non-transitory recording medium (a magnetic disk, an optical disk, a flash memory, or the like) and saved in the memory 20, or may be downloaded from an external server or the like and saved in the memory 20.

The target recognition unit 11 recognizes a target (pedestrian, another vehicle, or the like) existing in front of the vehicle 100 based on captured images acquired by the cameras 31a to 31d, an object position detection signal from the radar 32, and object position detection signals from the sonars 33a to 33h. While the embodiment describes a configuration that recognizes the target existing in the surroundings of the vehicle 100 by using the cameras 31a to 31d, the radar 32, and the sonars 33a to 33h, it is also possible to employ a configuration that recognizes the target not by using all of these but by using one of these or by a combination of two or more of these. Alternatively, it is also possible to employ a configuration that recognizes the target by other kinds of detection devices.

The display control unit 12 controls the operation of HUD 30 to control the output of the alert display 50 and to change the display mode of the surrounding icon 52. The sound image localization control unit 13 controls the output mode (output level, output timing, and the like) of the speakers 34a to 34d to change the sound image position of a prescribed alert sound perceived by the driver P. Note that there may simply need to be a plurality of speakers, and the number thereof may be three or less or five or more.

The influence degree recognition unit 14 recognizes the influence degree of the target for the vehicle 100 in four stages from level 0 to level 3 according to the recognized state of the target by the target recognition unit 11. Note that level 0 is a state where the target is not recognized by the target recognition unit 11. Levels 1 to 3 correspond to the state where the target is recognized by the target recognition unit 11, and the influence degree recognition unit 14 recognizes the influence degree by switching it from level 1 to level 2 and then to level 3, as the distance between the target and the vehicle 100 becomes shorter.

Note that the influence degree recognition unit 14 may recognize the influence degree by also considering the speed at which the target is approaching the vehicle 100. In this case, the influence degree recognition unit 14 recognizes the influence degree by switching it from level 1 to level 2 and then to level 3, as the speed at which the target is approaching the vehicle 100 becomes faster.

The display control unit 12 acquires the number of targets (target recognition result) recognized by the target recognition unit 11, and sets the alert level presented by the surrounding icon 52 and the alert sound in four stages from level 0 to level 3 based on the number of targets and the influence degree recognized by the influence degree recognition unit 14. When there is no target recognized by the target recognition unit 11, the display control unit 12 sets the alert level to level 0.

Furthermore, when the number of targets recognized by the target recognition unit 11 is one (a single target), the display control unit 12 sets the level of the influence degree of the target recognized by the influence degree recognition unit 14 as the alert level. For example, when the influence degree is level 2, the display control unit 12 sets the alert level to level 2.

Furthermore, when there is a plurality of targets recognized by the target recognition unit 11, the display control unit 12 increases the alert level as the number of targets increases. In the embodiment, the display control unit 12 sets the alert level to level 1 when the number of targets is two, sets the alert level to level 2 when the number of targets is three, and sets the alert level to level 3 when the number of targets is four or more. In this case, the number two corresponds to the upper limit number (threshold number) of the present disclosure.

When there are a plurality of targets recognized by the target recognition unit 11 and the influence degree of any one of the targets increases, the alert level may be increased. For example, in a state where there are two targets and the alert level is set to level 1, the alert level may be increased to level 2 from level 1 when the influence degree of one of the targets is increased to level 2.

The display control unit 12 sets the display mode (display range, diameter, color) of the surrounding icon 52 depending on the alert level according to the setting table illustrated in FIG. 12. The size of the surrounding icon 52 is defined by the diameter. For example, in a case where two targets are recognized by the target recognition unit 11, the display control unit 12 determines the alert level to level 1. Then, the target recognition unit 11 sets the display mode of the surrounding icon 52 as whole circular area, medium diameter, yellow, which corresponds to level 1 of a case where there are a plurality of targets.

2. Alert Processing

By referring to the explanatory diagrams illustrated in FIG. 7 to FIG. 11, the alert processing executed by the target recognition unit 11, the display control unit 12, the sound image localization control unit 13, and the influence degree recognition unit 14 will be described according to the flowcharts illustrated in FIG. 4 to FIG. 6.

Figure 4:
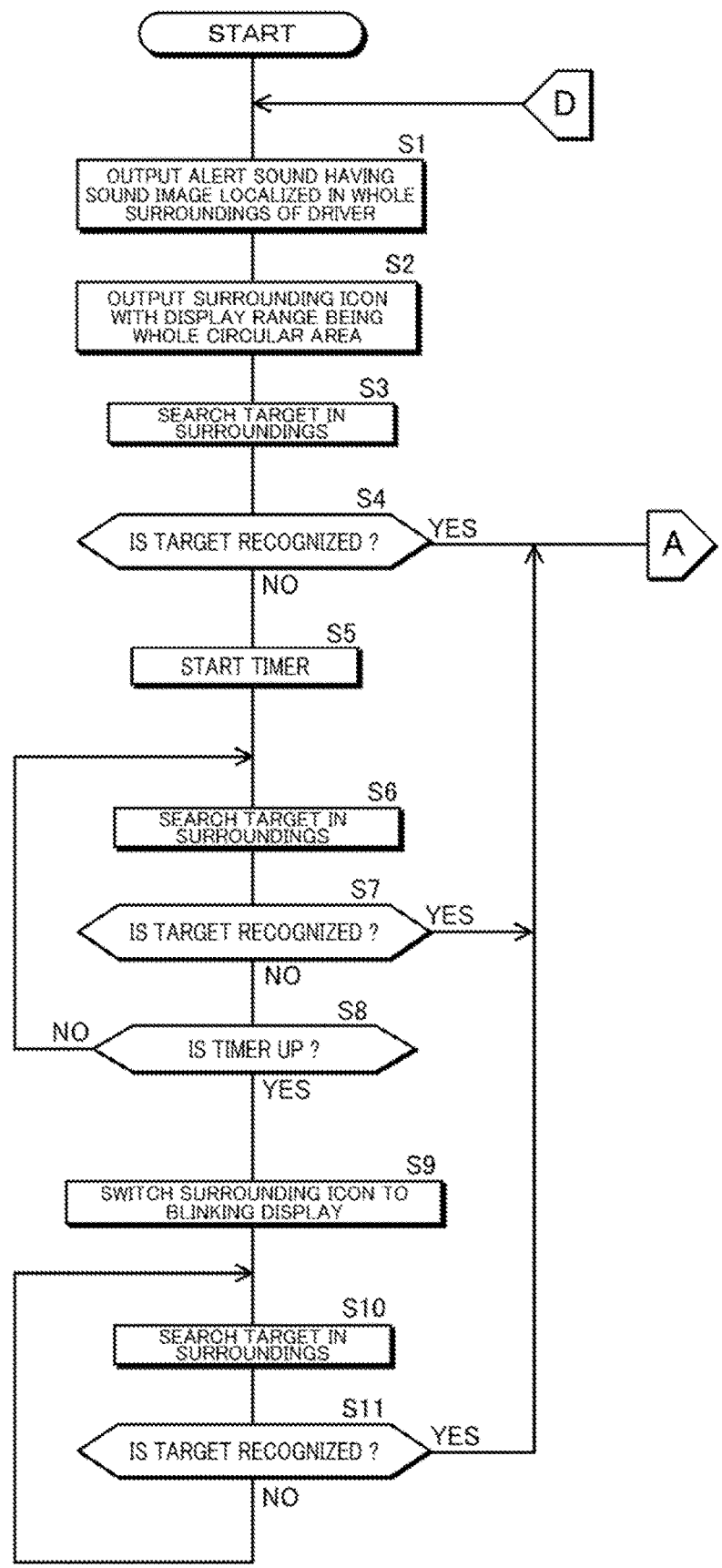
FIG. 4 is a first flowchart of alert processing.

In Step S1 of FIG. 4, the sound image localization control unit 13 outputs an alert sound by controlling the output mode of the speakers 34a to 34d such that the sound image position of the alert sound covers the whole surroundings of the driver P (corresponds to a prescribed range of the surroundings of an operator according to the present disclosure). Thereby, as illustrated in B1 of FIG. 11, a sound image position 60 of the alert sound becomes the whole surroundings of the driver P, so that the driver P can perceive the alert sound from the whole surroundings. The alert sound of such a case is set to a gentle sound giving a sense of security, which corresponds to the alert level 0.

In a following Step S2, the display control unit 12 displays the surrounding icon 52 by the HUD 30 by having the display range thereof as the whole circular area. As illustrated in A11 of FIG. 7, this provides a state where a virtual image of the circular surrounding icon 52 that surrounds the whole surroundings of the mobile body icon 51 is viewed by the driver P through the front window 40. The surrounding icon 52 in this case is displayed in white according to the alert level 0 according to the setting table of FIG. 12, thereby making it possible to encourage the driver P to pay attention in a wide range. The display mode of the surrounding icon 52 illustrated in A11 corresponds to a third display mode of the present disclosure.

In a next Step S3, the target recognition unit 11 searches a target existing in the surroundings of the vehicle 100. When the target existing in the surroundings of the vehicle 100 is recognized in a following Step S4, the target recognition unit 11 proceeds the processing to Step S20 of FIG. 5. In the meantime, when no target existing in the surroundings of the vehicle 100 is recognized, the target recognition unit 11 proceeds the processing to Step S5.

In Step S5, the display control unit 12 starts a timer for checking continuation of the state where no target existing in the surroundings of the vehicle 100 is recognized. The set time of the timer is set to 3 seconds, for example. By looping the processing of subsequent Steps S6 to S8, the target recognition unit 11 searches the target existing in the surroundings of the vehicle 100 in Step S6 until the time in the timer is up in Step S8. Then, in Step S7, the target recognition unit 11 proceeds the processing to Step S20 of FIG. 5 when the target existing in the surroundings of the vehicle 100 is recognized, and proceeds the processing to Step S8 when no target existing in the surroundings of the vehicle 100 is recognized.

In Step S9, the display control unit 12 switches the surrounding icon 52 to blinking display. The lighting mode of the surrounding icon 52 in this case corresponds to a fourth display mode of the present disclosure. The display control unit 12 blinks the surrounding icon 52 once in every several seconds, for example. This makes it possible to encourage the driver P to expand the caution range by not considering it as safe even when no target is recognized by the target recognition unit 11. In a next Step S10, the target recognition unit 11 searches the target existing in the surrounding of the vehicle 100. In a following Step S11, the target recognition unit 11 proceeds the processing to Step S20 of FIG. 5 when the target existing in the surroundings of the vehicle 100 is recognized, and proceeds the processing to Step S10 when no target existing in the surroundings of the vehicle 100 is recognized.

Figure 5:
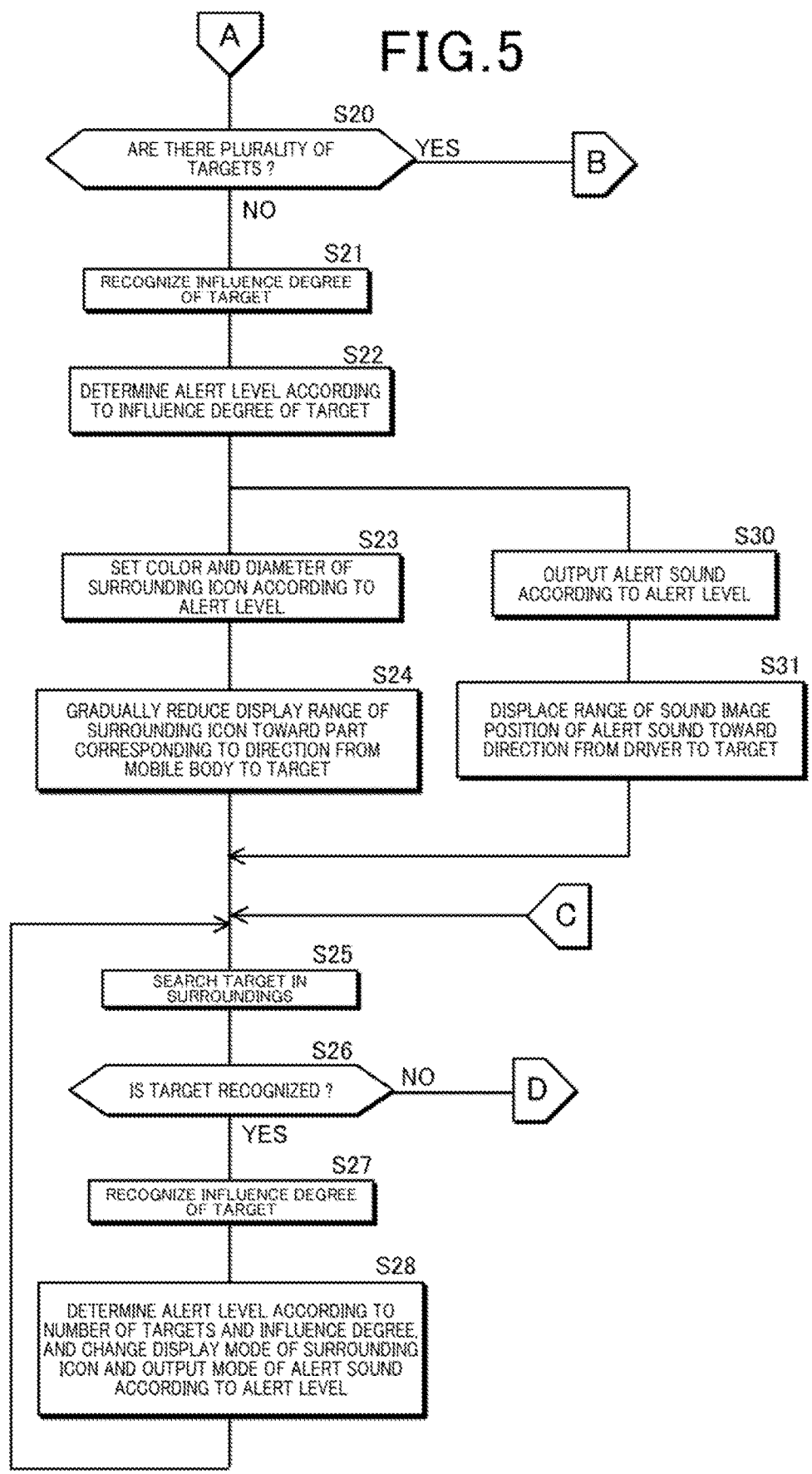
FIG. 5 is a second flowchart of the alert processing.
Figure 6:
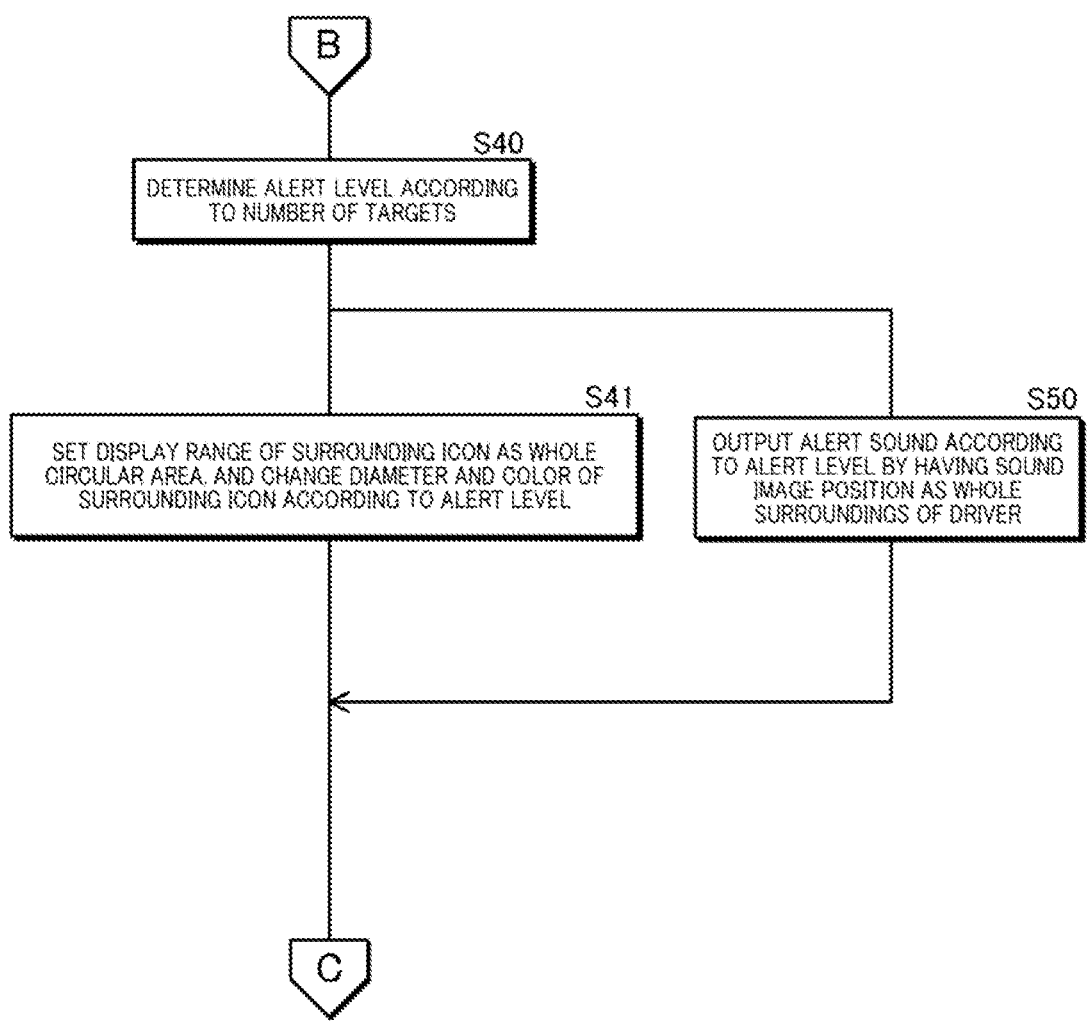
FIG. 6 is a third flowchart of the alert processing.

The target recognition unit 11 proceeds the processing to Step S40 of FIG. 6 when there are a plurality of recognized targets in Step S20 of FIG. 5, and proceeds the processing to Step S21 when there is a single recognized target. In Step S40, the display control unit 12 determines the alert level according to the number of targets, as described above.

In a following Step S41, the display control unit 12 sets the display range of the surrounding icon 52 as the whole circular area 52r (see FIG. 3), changes the diameter and the color of the surrounding icon 52 according to the alert level according to the setting table of FIG. 12, and proceeds the processing to Step S25 of FIG. 5. For example, when the alert level is level 2, the display control unit 12 sets the diameter of the surrounding icon 52 as "small" and the color as "orange" according to the setting table of FIG. 12.

The sound image localization control unit 13 executes processing of Step S50 in parallel to processing of Step S41 executed by the display control unit 12. In Step S50, the sound image localization control unit 13 outputs the alert sound according to the alert level with the sound image position being the whole surroundings of the driver P. In this case, the sound image localization control unit 13 performs processing such as increasing the volume of the alert sound or changing the tone of the alert sound such that the effect of the alert for the driver P becomes higher as the alert level is higher. Furthermore, the alert sound may be changed by superimposing a sound effect that helps imaging the attribute of the target (four-wheeled vehicle, two-wheeled vehicle, pedestrian, or the like) on the alert sound output in Step S1 of FIG. 4.

In the meantime, in a case where there is a single recognized target, the target recognition unit 11 proceeds the processing to Step S21 from Step S20. In Step S21, the influence degree recognition unit 14 recognizes the influence degree of the target. In a following Step S22, the display control unit 12 determines the alert level according to the influence degree of the target, as described above.

In a next Step S23, the display control unit 12 sets the color and diameter of the surrounding icon 52 according to the alert level according to the setting table of FIG. 12. For example, when the alert level is level 1, the display control unit 12 sets the color of the surrounding icon 52 as "yellow" and the diameter as "large". In a flowing Step S24, the display control unit 12 gradually reduces the display range of the surrounding icon 52 toward a part 52a corresponding to a direction from the vehicle 100 to the target as illustrated in FIG. 7, and proceeds the processing to Step S25.

Figure 7:
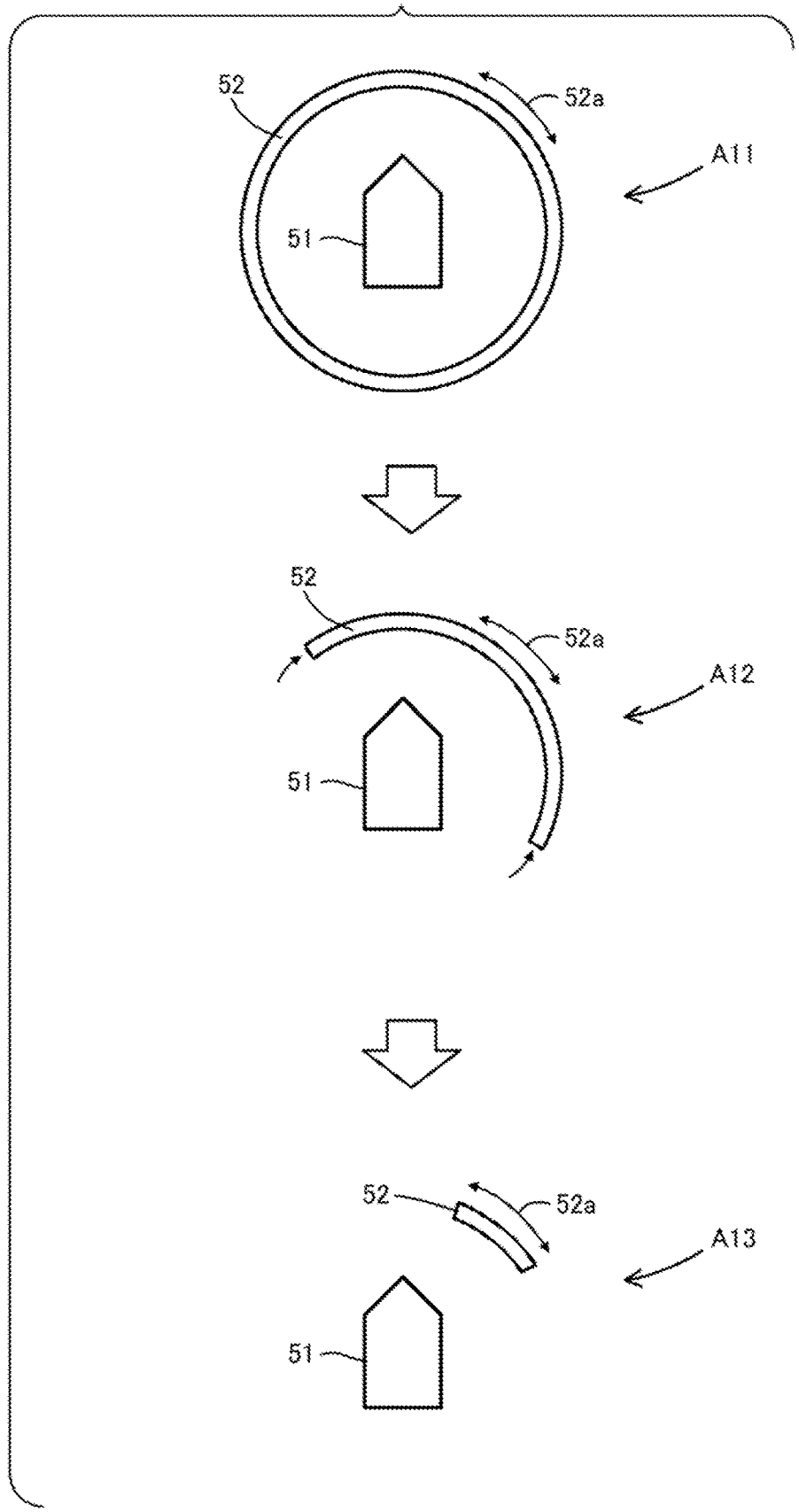
FIG. 7 is an explanatory diagram of processing for gradually reducing the display range of a surrounding icon, when a single target existing in front of the vehicle is recognized.

FIG. 7 illustrates a case where a target existing in the right front side of the vehicle 100 is recognized by the target recognition unit 11. As for the display mode of the surrounding icon 52, the display control unit 12 gradually reduces the display range from a state having the whole circular area as the display range as illustrated in A11 to a state having the part 52a as the display range as illustrated in A12 and A13. This makes it possible to encourage the driver P to pay attention to the right front side of the vehicle 100.

The sound image localization control unit 13 executes the processing of Step S30 and Step S31 in parallel to the processing of Steps S22 and S24. In Step S30, the sound image localization control unit 13 outputs an alert sound according to the alert level. In this case, the sound image localization control unit 13 outputs the alert sound with a still higher notification effect as the level of the influence degree of the target becomes higher. For example, the sound image localization control unit 13 may output an alert sound by superimposing a sound effect (onomatopoeia of engine sound or the like) that helps imaging the attribute of the target (four-wheeled vehicle, two-wheeled vehicle, pedestrian, or the like) on the alert sound that is started to be output in Step S1 of FIG. 4.

Figure 11:
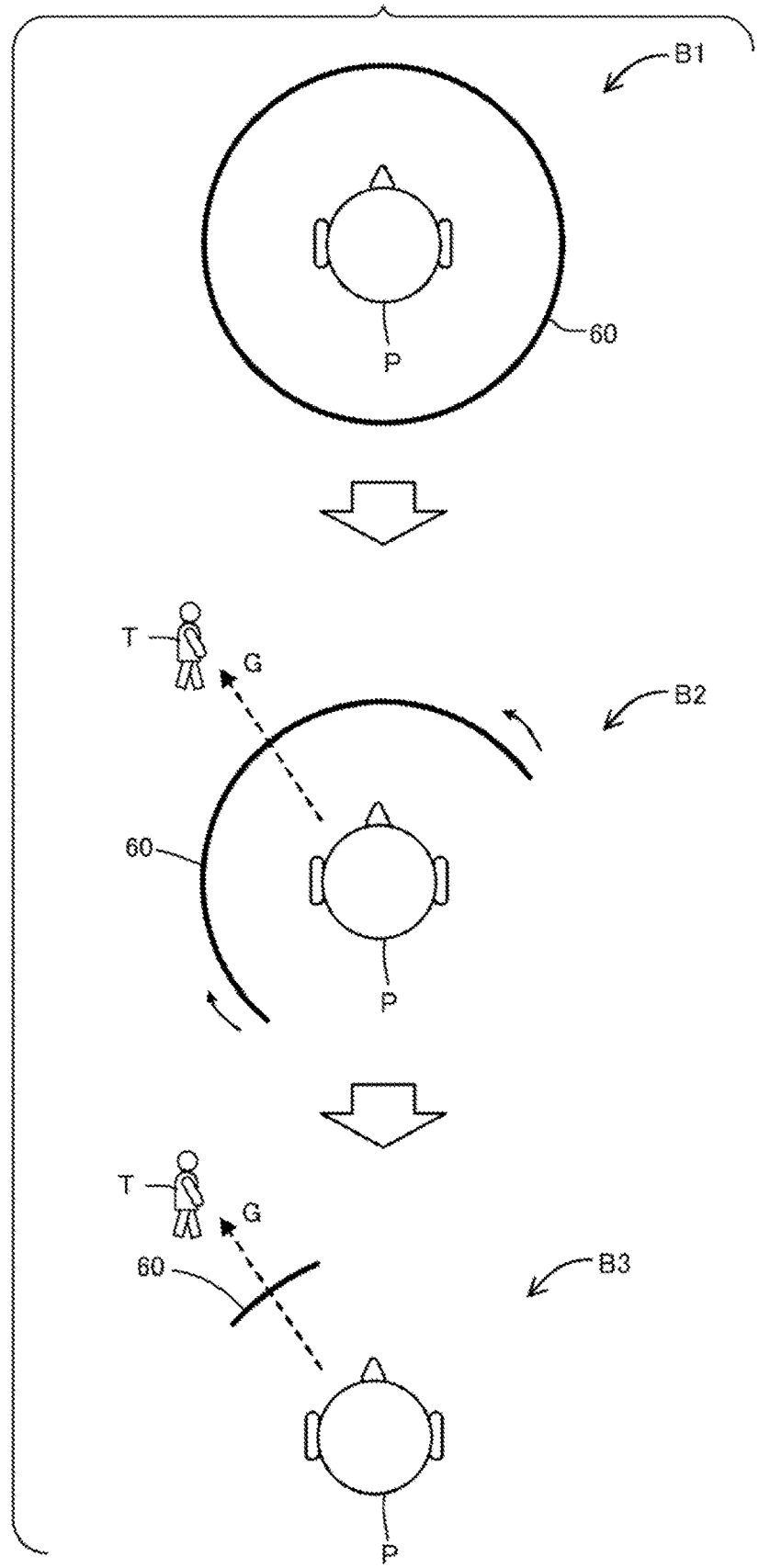
FIG. 11 is an explanatory diagram of processing for gradually reducing the range of sound image position of an alert sound from the driver toward the target.

In a next Step S31, the sound image localization control unit 13 gradually reduces the range of the sound image position 60 of the alert sound from the whole surroundings of the driver P illustrated in B1 toward a direction G that is from the driver P toward a target T as illustrated in B2 and B3 of FIG. 11, and proceeds the processing to Step S24. This provides a state where the driver P perceives the alert sound only from the direction of the target, so that it is expected that the attention of the driver P is directed toward the target.

In Step S25, the target recognition unit 11 searches the target existing in the surroundings of the vehicle 100. In a following Step S26, the target recognition unit 11 proceeds the processing to Step S26 when the target is recognized, and proceeds the processing to step S1 of FIG. 4 when no target is recognized.

In Step S27, the influence degree recognition unit 14 recognizes the influence degree of the target. In a following Step S28, the display control unit 12 determines the alert level according to the number of targets recognized by the target recognition unit 11 and the influence degree of the target recognized by the influence degree recognition unit 14. Then, the display control unit 12 changes the display mode of the surrounding icon 52 according to the change in the alert level. Furthermore, the sound image localization control unit 13 changes the output mode of the alert sound according to the alert level. Specifically, the display control unit 12 changes the display mode of the surrounding icon 52 as follows.

(1) When there is Change from Single Target to Plurality of Targets

Figure 8:
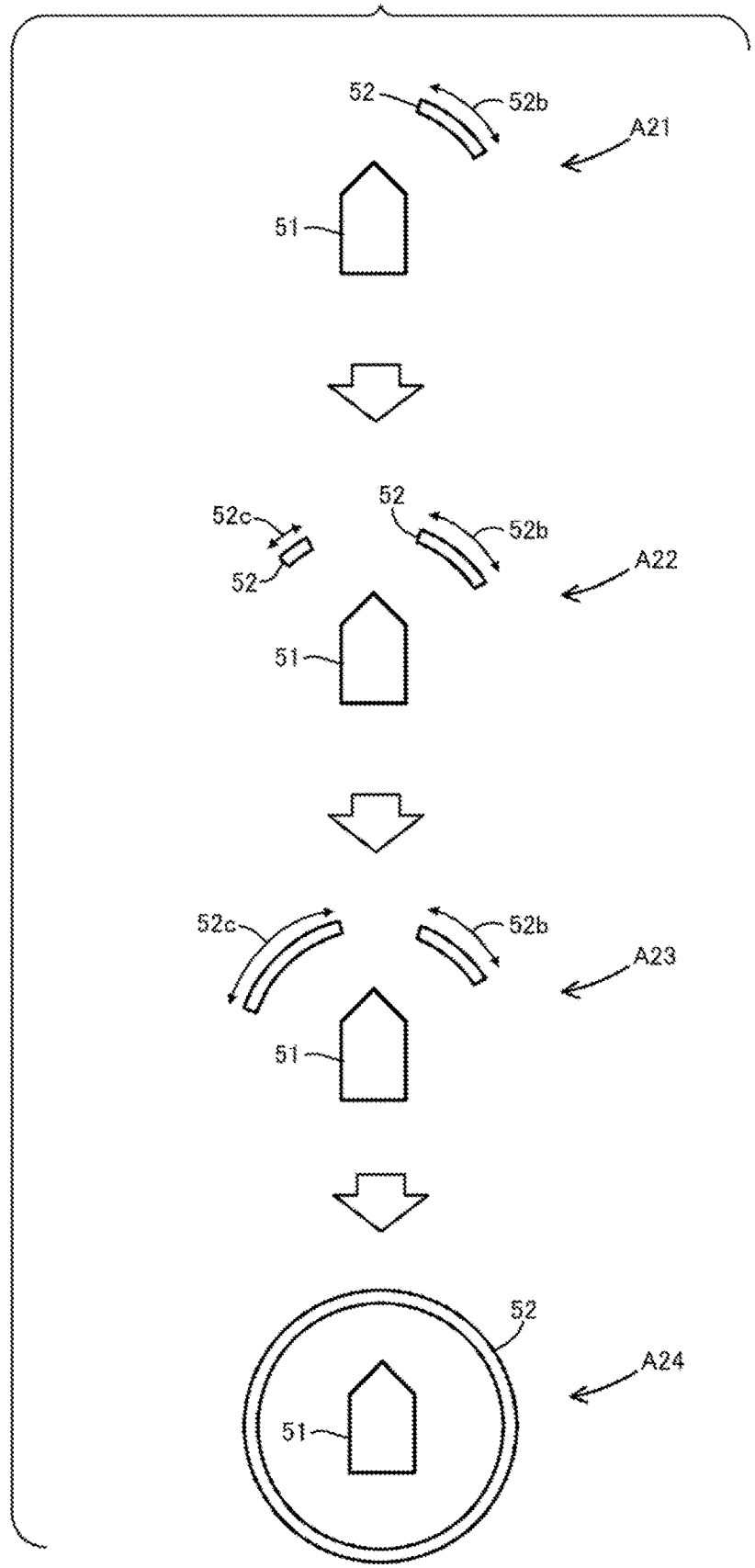
FIG. 8 is an explanatory diagram of processing for expanding the display range of the surrounding icon, when the number of targets existing in front of the vehicle increases.

As illustrated in FIG. 8, the display control unit 12 expands the display range of the surrounding icon 52 to the whole range of the circular area from A21 to A22 to A23 and then to A24. Note that A21 in FIG. 8 indicates a state where a single target existing in the right front side of the vehicle 100 is recognized by the target recognition unit 11, and the display control unit 12 sets a part 52b corresponding to the direction from the vehicle 100 toward the target as the display range of the surrounding icon 52. Furthermore, A22 in FIG. 8 indicates a state where a target existing in the left front side of the vehicle 100 is also recognized, and the display control unit 12 adds a part 52c corresponding to the direction from the vehicle 100 toward the target on the left front side to the display range of the surrounding icon 52.

Then, the display control unit 12 expands the parts 52a and 52b corresponding to the directions of the two targets in the circumferential direction as illustrated in A23 so as to make the display range of the surrounding icon 52 to be the whole range of the circular area as illustrated in A24. As described, when the number of targets recognized by the target recognition unit 11 changes from a single target to a plurality of targets, it is possible to encourage the driver P to pay attention to a plurality of targets by expanding the display range of the surrounding icon 52 from the part corresponding to the direction of the target to the whole range of the circular area.

(2) When the Number of Targets Increases

Figure 9:
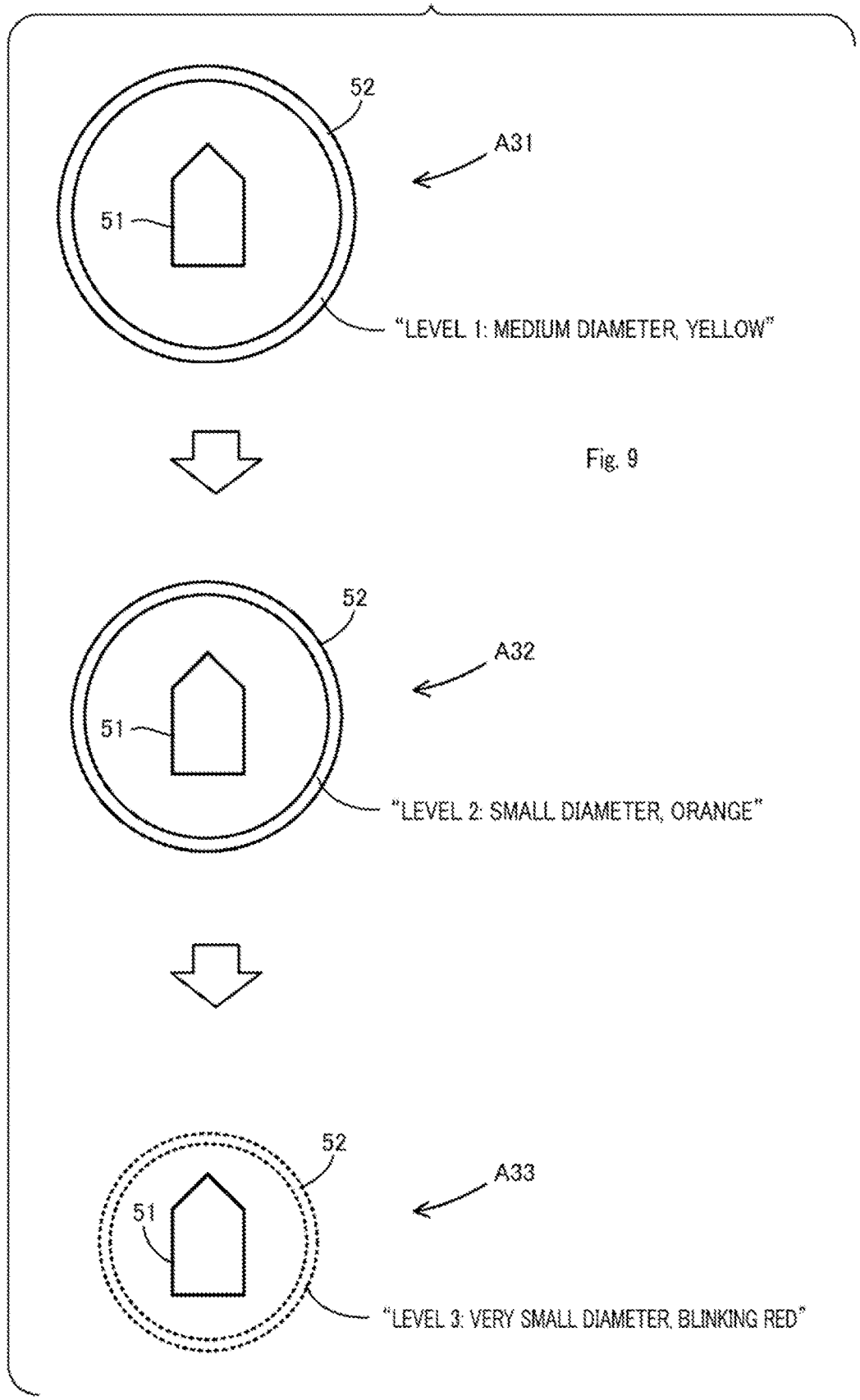
FIG. 9 is an explanatory diagram of processing for reducing the diameter of the surrounding icon according to an increase in an alert level.

When the number of targets recognized by the target recognition unit 11 increases, the display control unit 12 changes the display mode of the surrounding icon 52 according to the setting table illustrated in FIG. 12. FIG. 9 illustrates a state where a plurality of targets are recognized by the target recognition unit 11, and the surrounding icon 52 is displayed by the display control unit 12 with the whole range of the circular area being the display range.

As illustrated in FIG. 9, according to the increase in the number of targets (from two targets to three targets and then to four targets), the display control unit 12 changes from "medium diameter, yellow" of A31 corresponding to level 1 of the alert level to "small diameter, orange" of A32 corresponding to level 2, and then to "very small diameter, blinking red" corresponding to level 3, according to the setting table illustrated in FIG. 12. As described, by decreasing the diameter of the surrounding icon 52 to shorten the space between the mobile body icon 51 and the surrounding icon 52 and also changing the color and the lighting mode of the surrounding icon 52, it is possible to more strongly encourage the driver P to pay attention to the targets.

When the number of targets decreases, the display control unit 12 also changes the display mode of the surrounding icon 52 according to the setting table illustrated in FIG. 12. For example, when the number of targets decreases from a state where four targets are recognized by the target recognition unit 11 (from four targets to three targets and then to two targets), the display control unit 12 changes the display mode of the surrounding icon 52 from A33 to A32 and then to A31 illustrated in FIG. 9.

Figure 10:
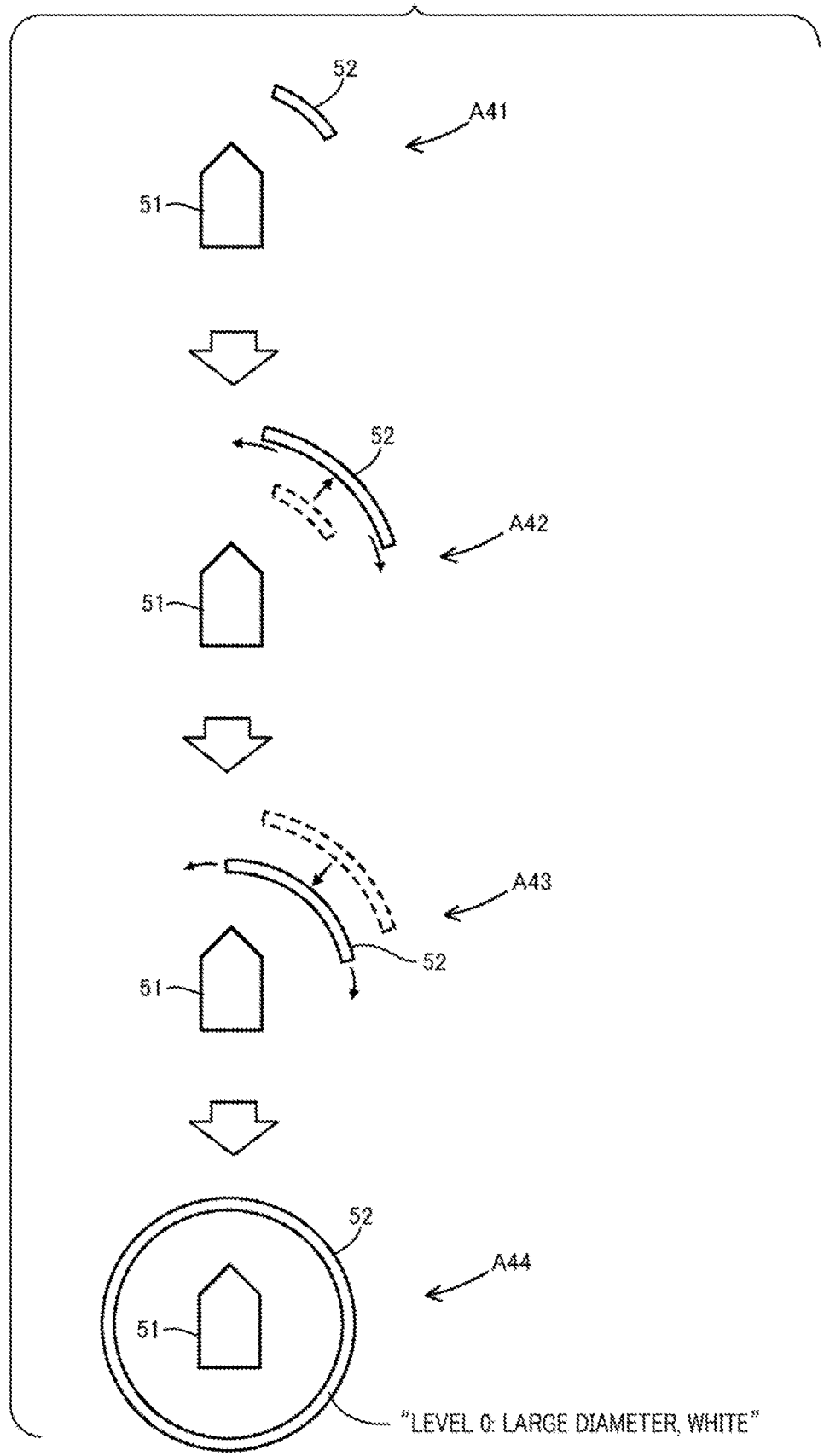
FIG. 10 is an explanatory diagram of processing for changing a display mode of the surrounding icon, when a state where the target is recognized shifts to a state where the target is not recognized.

(3) When State where Target is Recognized Shifts to State where No Target is Recognized When a state where a target is recognized by the target recognition unit 11 shifts to a state where no target is recognized by the target recognition unit 11, the display control unit 12 performs processing for moving the surrounding icon 52 away from the mobile body icon 51 once, as illustrated in FIG. 10.

A41 in FIG. 10 illustrates a state where the surrounding icon 52 corresponding to the target existing in the right front side of the vehicle 100 is displayed. The display mode of the surrounding icon 52 illustrated in A41 corresponds to a first display mode of the present disclosure. When this state shifts to a state where no target is recognized by the target recognition unit 11, the display control unit 12 moves the surrounding icon 52 away from the mobile body icon 51 and expands the display range in the circumferential direction to be displayed, as illustrated in A42.

Subsequently, the display control unit 12 makes the surrounding icon 52 in the size of "large diameter" that corresponds to level 0 of the alert level, and moves the surrounding icon 52 closer to the mobile body icon 51, as illustrated in A43. Then, the display control unit 12 expands the display range of the surrounding icon 52 toward the ambient direction of the surrounding icon 52 and sets the display mode to "large diameter, white" that corresponds to level 0, as illustrated in A44. The display mode of the surrounding icon 52 illustrated in A44 corresponds to a second display mode of the present disclosure. As described, by performing display by moving the surrounding icon 52 away from the mobile body icon once and then setting it to the display mode corresponding to level 0, it is possible to help the driver P intuitively perceive that the necessity of paying attention to the target is lowered.

3. Another Embodiment

In the embodiment above, as the alert processing for the driver P, executed are the processing of changing the display mode of the alert display 50 by the display control unit 12 and the processing of changing the sound image position of the alert sound by the sound image localization control unit 13. As another embodiment, the sound image localization control unit 13 may be omitted, and only the processing of changing the display mode of the alert display 50 by the display control unit 12 may be performed.

While the four-wheeled vehicle 100 is described in the embodiment above as a mobile body of the present disclosure, the mobile body of the present disclosure may be any mobile body operated by an operator, such as a two-wheeled vehicle, a flying object, a boat, or the like, for example.

In the embodiment above, when there is a single target recognized by the target recognition unit 11, the display control unit 12 sets the alert level according to the influence degree of the target recognized by the influence degree recognition unit 14 and changes the display mode of the alert display according to the setting table of the alert display illustrated in FIG. 12. As another embodiment, it is possible to employ a configuration in which the influence degree recognition unit 14 is omitted and the processing of changing the display mode of the alert display according to the influence degree of the target is not performed.

In the embodiment above, when a state where no target is recognized by the target recognition unit 11 continues for a prescribed time or more, the display control unit 12 switches the alert display 50 from a lighting display (third display mode) to blinking display (fourth display mode) by the processing of Steps S5 to S9 illustrated in FIG. 4. As another configuration, the fourth display mode may be a display mode other than the blinking display. For example, the display mode of the alert display 50 may be switched to a fourth display mode that is different from the third display mode, by changing the brightness, changing the color, or the like. Furthermore, the processing of Steps S5 to S9 illustrated in FIG. 4 may be omitted.

While the HUD 30 is described in the embodiment above as the display device of the present disclosure, the display device of the present disclosure may have any configuration capable of outputting a visual display that can be viewed by the operator on the front window of the mobile body, and it may also be a display device other than a HUD.

While the size of the surrounding icon 52 is defined by the diameter of the surrounding icon 52 in the embodiment above, the size of the surrounding icon 52 may also be defined by the perimeter or the like of the surrounding icon 52. Furthermore, while the surrounding icon 52 is formed in a circular shape in the embodiment above, the surrounding icon 52 may be in any shape that surrounds the mobile body icon 51, such as an elliptical shape, a rectangular shape, or the like.

Note that FIG. 1 is a schematic diagram illustrating the configuration of the alert system 1 by sectioning it according to the main processing contents in order to facilitate understanding of the present invention, and the configuration of the alert system 1 may also be formed by other sectioned blocks. Furthermore, the processing of each structural element may be executed by a single hardware unit or may be executed by a plurality of hardware units. Moreover, the processing of each structural element illustrated in FIG. 4 to FIG. 6 may be executed by a single program or may be executed by a plurality of programs.

4. Configurations Supported by the Embodiments

The above-described embodiments are specific examples of the following configurations.

(Configuration 1) An alert system including: a display device configured to output, to a front window of a mobile body, a visual display viewable by an operator of the mobile body; a display control unit configured to cause the display device to output a prescribed alert display to the front window as the visual display; and a target recognition unit configured to recognize a target existing in surroundings of the mobile body, in which the display control unit: causes the display device to display, on the front window, the alert display including a mobile body icon representing the mobile body and a surrounding icon a display range of which is changed in a circumferential direction of a circular area that surrounds the mobile body icon; when the target is recognized by the target recognition unit, causes the display device to display the surrounding icon on the front window by having a range including a part corresponding to a direction of the target with respect to the mobile body as the display range; when the number of the targets recognized by the target recognition unit is equal to or more than a prescribed upper limit number, sets the display range of the surrounding icon as the whole circular area; and in a state where the number of the targets recognized by the target recognition unit is equal to or more than the upper limit number and the display range of the surrounding icon is set as the whole circular area, when the number of the targets recognized by the target recognition unit increases, reduces a size of the surrounding icon.

According to the alert system of configuration 1, it is possible to support the operator to promptly pay attention to the target.

(Configuration 2) The alert system according to configuration 1, in which the display control unit: when the target is not recognized by the target recognition unit, sets the display range of the surrounding icon as the whole circular area; and when a state where the target is not recognized by the target recognition unit shifts to a state where the target is recognized by the target recognition unit, gradually reduces the display range of the surrounding icon from the whole circular area to a part of the circular area corresponding to a direction from the mobile body toward the target.

According to the alert system of configuration 2, it is possible to encourage the operator to pay attention to the direction where the target exists.

(Configuration 3) The alert system according to configuration 1 or 2, in which, when a state where the target of less than the upper limit value is recognized by the target recognition unit and a display mode of the surrounding icon is set to a first display mode that has a part of the circular area corresponding to the direction of the target with respect to the mobile body as the display range shifts to a state where the target is not recognized by the target recognition unit, the display control unit switches the display mode of the surrounding icon to a second display mode that has the whole circular area as the display range.

According to the alert system of configuration 3, it is possible to encourage the operator to pay attention in a wide range of the surroundings of the mobile body, when turned into a state where the target is not recognized.

(Configuration 4) The alert system according to configuration 3, in which the display control unit performs processing for expanding a space between the mobile body icon and the surrounding icon once, while switching the display mode of the surrounding icon from the first display mode to the second display mode.

According to the alert system of configuration 4, it is possible to help the operator intuitively perceive that the necessity of paying attention to the target is lowered.

(Configuration 5) The alert system according any one of configurations 1 to 4, in which the display control unit: when the target is not recognized by the target recognition unit, sets the display mode of the surrounding icon to a third display mode that has the whole circular area as the display range; and when the state where the target is not recognized by the target recognition unit continues for a prescribed time or more, sets the display mode of the surrounding icon to a fourth display mode that is different from the third display mode, with the whole circular area being the display range.

According to the alert system of configuration 5, when the state where the target is not recognized by the target recognition unit continues for the prescribed time or more, it is possible to encourage the operator to expand the caution range by not considering it as safe.

(Configuration 6) The alert system according to any one of configurations 1 to 5, including an influence degree recognition unit configured to recognize an influence degree of the target recognized by the target recognition unit for the mobile body, in which the display control unit changes a display mode of the surrounding icon according to the influence degree of the target.

According to the alert system of configuration 6, it is possible to notify the operator of the influence degree of the target for the mobile body by the difference in the display modes of the alert display.

(Configuration 7) The alert system according to any one of configurations 1 to 6, including a sound image localization control unit configured to change a sound image position of a prescribed alert sound perceived by the operator by controlling an output mode of a plurality of speakers provided in the mobile body, in which the sound image localization control unit: when the target is not recognized by the target recognition unit, sets the sound image position of the alert sound to a prescribed range of the surroundings of the operator; and when a state where the target is not recognized by the target recognition unit shifts to a state where the target is recognized by the target recognition unit, gradually reduces the range of the sound image position of the alert sound from the prescribed range toward a direction from the operator to the target.

According to the alert system of configuration 7, it is possible to increase the effect of directing the attention of the operator toward the target by gradually reducing the range of the sound image position of the alert sound toward the direction from the operator to the target.

(Configuration 8) A non-transitory recording medium storing a control program for causing a computer to execute processing of: acquiring a recognition result of a target recognition unit that recognizes a target existing in surroundings of a mobile body; causing a controller that controls an operation of a display device to control the display device to display a prescribed alert display according to the recognition result on a front window of the mobile body as a visual display, the display device outputting the visual display viewable by an operator of the mobile body on the front window; causing the display device to display, on the front window, the alert display including a mobile body icon representing the mobile body and a surrounding icon a display range of which is changed in a circumferential direction of a circular area surrounding the mobile body icon; when the target is recognized by the target recognition unit, causing the display device to display the surrounding icon on the front window by having a range including a part corresponding to a direction of the target with respect to the mobile body as the display range; when the number of targets recognized by the target recognition unit is a prescribed upper limit number or more, setting the display range of the surrounding icon to the whole circular area; and in a state where the number of the targets recognized by the target recognition unit is equal to or more than the upper limit number and the display range of the surrounding icon is set as the whole circular area, when the number of the targets recognized by the target recognition unit increases, reducing a size of the surrounding icon.

By causing the controller to execute the control program of configuration 8, it is possible to achieve the same operation effect as that of the alert system of configuration 1.

REFERENCE SIGNS LIST

1 Alert system
2 Controller
10 Processor
11 Target recognition unit
12 Display control unit
13 Sound image localization control unit
14 Influence degree recognition unit
20 Memory
21 Control program
30 HUD (display device)
31a to 31d Camera
32 Radar
33a to 33h Sonar
34a to 34d Speaker
40 Front window
50 Alert display
51 Mobile body icon
52 Surrounding icon
60 Sound image position of alert sound
P Driver (operator)
T Target

What is claimed is:

1. An alert system comprising:
a display device configured to output, to a front window of a mobile body, a visual display viewable by an operator of the mobile body;
a display control unit configured to cause the display device to output a prescribed alert display to the front window as the visual display; and
a target recognition unit configured to recognize a target existing in surroundings of the mobile body, wherein
the display control unit:
causes the display device to display, on the front window, the alert display including a mobile body icon representing the mobile body and a surrounding icon a display range of which is changed in a circumferential direction of a circular area that surrounds the mobile body icon;
when the target is recognized by the target recognition unit, causes the display device to display the surrounding icon on the front window by having a range including a part corresponding to a direction of the target with respect to the mobile body as the display range;
when the number of the targets recognized by the target recognition unit is equal to or more than a prescribed upper limit number, sets the display range of the surrounding icon as a whole circular area; and
in a state where the number of the targets recognized by the target recognition unit is equal to or more than the upper limit number and the display range of the surrounding icon is set as the whole circular area, when the number of the targets recognized by the target recognition unit increases, reduces a size of the surrounding icon.

2. The alert system according to claim 1, wherein the display control unit:
when the target is not recognized by the target recognition unit, sets the display range of the surrounding icon as the whole circular area; and
when a state where the target is not recognized by the target recognition unit shifts to a state where the target is recognized by the target recognition unit, gradually reduces the display range of the surrounding icon from the whole circular area to a part of the circular area corresponding to a direction from the mobile body toward the target.

3. The alert system according to claim 1, wherein, when a state where the target of less than the upper limit value is recognized by the target recognition unit and a display mode of the surrounding icon is set to a first display mode that has a part of the circular area corresponding to the direction of the target with respect to the mobile body as the display range shifts to a state where the target is not recognized by the target recognition unit, the display control unit switches the display mode of the surrounding icon to a second display mode that has the whole circular area as the display range.

4. The alert system according to claim 3, wherein the display control unit performs processing for expanding a space between the mobile body icon and the surrounding icon once, while switching the display mode of the surrounding icon from the first display mode to the second display mode.

5. The alert system according to claim 1, wherein the display control unit: when the target is not recognized by the target recognition unit, sets the display mode of the surrounding icon to a third display mode that has the whole circular area as the display range; and when the state where the target is not recognized by the target recognition unit continues for a prescribed time or more, sets the display mode of the surrounding icon to a fourth display mode that is different from the third display mode, with the whole circular area being the display range.

6. The alert system according to claim 1, comprising an influence degree recognition unit configured to recognize an influence degree of the target recognized by the target recognition unit for the mobile body, wherein
the display control unit changes a display mode of the surrounding icon according to the influence degree of the target.

7. The alert system according to claim 1, comprising a sound image localization control unit configured to change a sound image position of a prescribed alert sound perceived by the operator by controlling an output mode of a plurality of speakers provided in the mobile body, wherein
the sound image localization control unit:
when the target is not recognized by the target recognition unit, sets the sound image position of the alert sound to a prescribed range of the surroundings of the operator; and
when a state where the target is not recognized by the target recognition unit shifts to a state where the target is recognized by the target recognition unit, gradually reduces the range of the sound image position of the alert sound from the prescribed range toward a direction from the operator to the target.

8. A non-transitory recording medium storing a control program for causing a computer to execute processing of:
   acquiring a recognition result of a target recognition unit that recognizes a target existing in surroundings of a mobile body;
   causing a controller that controls an operation of a display device to cause the display device to display a prescribed alert display according to the recognition result on a front window of the mobile body as a visual display, the display device outputting the visual display viewable by an operator of the mobile body on the front window;
   causing the display device to display, on the front window, the alert display including a mobile body icon representing the mobile body and a surrounding icon a display range of which is changed in a circumferential direction of a circular area surrounding the mobile body icon;
   when the target is recognized by the target recognition unit, causing the display device to display the surrounding icon on the front window by having a range including a part corresponding to a direction of the target with respect to the mobile body as the display range;
   when the number of targets recognized by the target recognition unit is a prescribed upper limit number or more, setting the display range of the surrounding icon to a whole circular area; and
   in a state where the number of the targets recognized by the target recognition unit is equal to or more than the upper limit number and the display range of the surrounding icon is set as the whole circular area, when the number of the targets recognized by the target recognition unit increases, reducing a size of the surrounding icon.

* * * * *